July 16, 1963 C. H. STARN 3,098,203
SIGNALING SYSTEM CONTROL FOR A MODULATOR
Filed Oct. 30, 1959
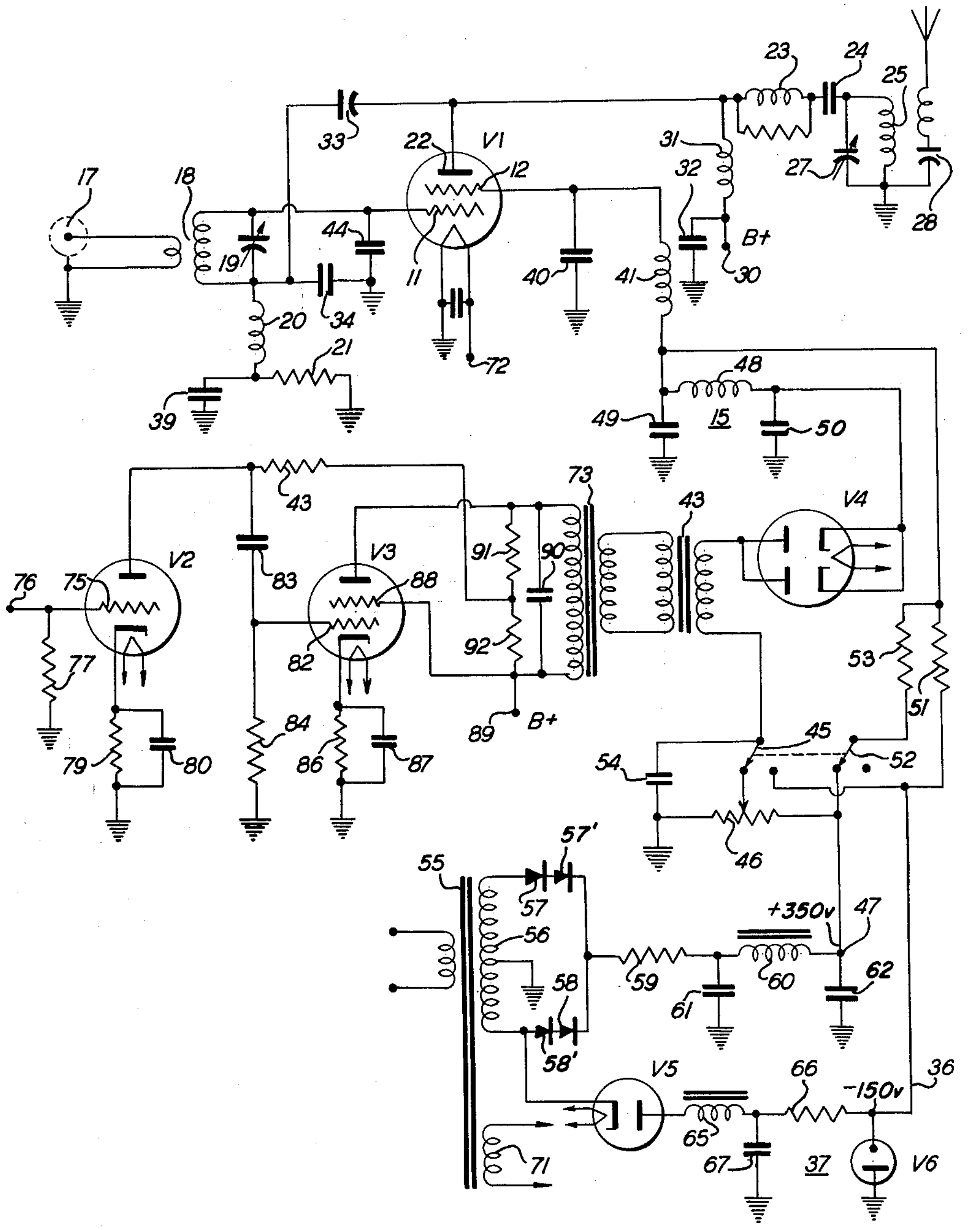
INVENTOR
CHARLES H. STARN
BY Craig and Freudenberg
ATTORNEYS United States Patent Office 3,098,203

Patented July 16, 1963

3,098,203

SIGNALING SYSTEM CONTROL FOR A MODULATOR

Charles H. Starn, 1117 SE. 6th St., Fort Lauderdale, Fla.

Filed Oct. 30, 1959, Ser. No. 849,856
7 Claims. (Cl. 332—44)

This invention relates to a signal control system for modulating a radio frequency signal with a signal of lower frequency, particularly an audio frequency, in a radio transmitter or the like. More specifically, the invention is concerned with an improved screen grid modulation apparatus.

Modulating systems wherein the modulating signal is applied to a control electrode such as a grid in a multi-electrode tube have been known heretofore and possess certain advantages over modulating systems in which the modulating signal is applied, for example, by a coupling transformer, to the plate circuit. Plate modulation has recognized disadvantages in the amount of audio power required, but, on the other hand, grid modulation has shown disadvantages in that the carrier power output is usually reduced for any particular type of tube. Among the advantages of grid modulation, particularly modulation by imposing the modulating signal on the screen grid, are substantial weight reductions of the apparatus, achieving greater convenience in portability, and lower power requirements, particularly in the audio stages which supply the modulating signal.

In prior systems, screen grid modulation has been achieved by applying to the screen grid the complete wave form of the audio modulating voltage, i.e., both the positive and negative swings of the audio voltage appear in the screen grid. In such circumstances, the efficiency has been relatively low, and the modulated signal is such as to require use of a conventional amplitude modulation receiver.

It is an object of the present invention to provide an improved modulating process in an improved modulator system which not only possesses the aforementioned advantages of light weight and low power consumption, but which also achieves the additional advantages of relatively high efficiency, attained in part by low power consumption when the modulating signal is absent or at a minimum level, and a system which is relatively simple and inexpensive.

Still another object of this invention is to provide a modulator system using screen grid modulation and achieving the foregoing advantages.

Still another object of this invention is to provide an improved modulator in which the modulated signal can be so produced as to be received and readable by either conventional amplitude modulation receivers or by receivers used exclusively for side band reception.

Further objects of this invention are to achieve in modulators as specified herein simple means for limiting the band width of the modulating signal and/or to provide ready adjustment for suppression or insertion of the radio frequency carrier in a modulated signal.

Still another object of this invention is to provide an improved screen grid modulator in which the power level of the residual or unmodulated carrier may be adjusted, preferably by simple manually adjustable means, this adjustable means providing a high degree of carrier suppression as desired.

In accordance with this invention, the foregoing objects may be achieved by means of a modulator utilizing a tube having an input to which is supplied a radio frequency signal, and an output at which the radio frequency signal appears in a modulated form, depending upon the characteristics of the modulating signal, the latter being applied uniquely to the tube by means of a control electrode, more particularly a screen grid. The screen grid is supplied with the modulating signal from an audio or speech amplifier, the output of which is rectified so that pulses of only one polarity of the audio signal are applied to the screen grid providing there is no other potential source of like polarity to make the screen grid positive, i.e., if the modulating signal is connected in series with a rectifier between the screen grid and the cathode, only positive pulses of the modulating envelope would appear on the screen grid. While operating under such conditions, the screen grid can be biased so that during pulses of the opposite polarity of the audio signal, only a constant nominal radio frequency carrier amplitude will appear at the output of the modulator. The rectified audio pulses may be obtained by means of a transformer, the primary of which is energized by the audio amplifier and the secondary of which is connected in the screen grid circuit in series with a rectifier, the rectifier cathode being connected to the screen grid. The screen grid circuit may be provided with connections to a direct current power source either to bias the rectifier or to connect in series therewith a direct current potential, the value of which may determine the residual carrier level or the degree of suppression of the carrier. A varying load may be imposed upon the audio or speech amplifier by the modulator and it is preferable that the audio amplifier have negative feedback to provide stabilization thereof.

With the system according to this invention, the carrier may be substantially suppressed and essentially only the positive pulses of the audio signal will modulate the radio frequency carrier, and the amplitude of the modulated carrier envelope will be dependent upon the amplitude level of the modulating signal.

The foregoing objects, advantages and characteristics and the following description are cited merely by way of example of the features of, and as explanation of, the present invention and are not to be taken as limitations of the scope of this invention except as described herein in the appended claims, the objects and advantages being more obvious from the following description which includes reference to the drawing showing one embodiment of the present invention.

The drawing illustrates a modulator system having a modulator stage comprising a tetrode tube VI to the control grid 11 of which is supplied a radio frequency carrier signal, and to the screen grid 12 of which is applied a rectified lower frequency, or audio frequency, signal. The audio frequency modulating signal is obtained from an audio amplifier having amplifying tubes V2 and V3 and the output of this audio amplifier is coupled by a suitable transforming arrangement to a circuit connected to the screen grid of tube V1, this circuit having in series a rectifier V4 with its cathode connected to the screen grid so that audio pulses of only one polarity appear at the screen grid to modulate the radio frequency carrier. In the screen grid circuit, between the rectifier V4 and the screen grid, there may be provided an audio filter 15 to control the range of audio frequencies applied to the screen grid.

Referring now in greater detail to the illustrated circuitry, the radio frequency carrier is applied at the input terminal 17 from a suitable source (not illustrated) and is coupled to control grid 11 of tube V1 by means of a radio frequency transformer 18, the secondary of which is tuned by capacitor 19 and having one end connected to the control grid 11, the other end of the secondary being connected through a radio frequency choke 20 and a grid biasing resistor 21 to ground. The resistor 21 provides variations in grid bias changing with the audio signal. The plate or anode 22 of tube V1 is connected through a parasitic-suppressing resistance-loaded inductance 23 and a capacitance 24 in series to one end of the primary of an antenna coupling transformer 25, the primary being tuned by a variable capacitor 27 and having its other end grounded. One terminal of the secondary of transformer 25 is connected to an antenna or other suitable output and the other terminal is connected to ground through a variable capacitor 28.

The plate circuit of the modulator tube V1 is provided with a B+ terminal 30 between which and ground is connected a suitable source (not shown) of high direct current potential of the order of 2500 to 4000 volts. A radio frequency choke 31 between the anode 22 and terminal 30 blocks radio frequency energy in the plate circuit from the direct current source, and a condenser 32 provides audio frequency by-pass from the terminal 30 to ground. A neutralizing condenser 33 connects the anode 22 with the control grid circuit, the latter also including a small grid bypass capacitor 34 and capacitor 44 for parasitic suppression.

The screen grid 12 of V1 has a grounded by-pass condenser 40 and is energized through a series circuit comprising, in the following order from the grid, a radio frequency choke 41, the filter 15, the rectifier V4, the secondary of a transformer 43, and a double-throw switch 45 which in its illustrated position further connects this series circuit to an adjustable tap of a potentiometer 46, one end of the which is grounded and the other end energized at 350 volts positive from a terminal 47 of a direct current power source described hereinafter. The audio filter 15 includes in the series circuit an inductance 48, the ends of which are connected to ground through the capacitors 49 and 50, respectively. The inductance 48 and capacitors 49 and 50 are given values dependent on the desired bandwidth of audio frequencies. Ganged with the switch 45 is a single-throw switch 52 which, in the illustrated position, connects the point of the series circuit between the radio frequency choke 41 and the filter 15 to the direct current power source terminal 47 through a resistor 53 to develop a small bias voltage of the order of ten volts on the screen grid across rectifier V4, the rectifier cathode being thereby biased positive relative to the anode. This resistor 53 sets the modulation during negative audio swings to about 95% to prevent clipping. In other words, negative audio swings cannot reduce the carrier level to zero during modulation.

The switch 45 may be moved into a second position in which the movable contact connects the secondary of transformer 43 to a closely regulated negative potential, of the order of −150 volts, established at the terminal 36 of the direct current source 37. The movable contact of switch 45 is at all times shunted to ground through a capacitor 54. A resistor 51 connects the junction point of the choke 41 and filter 15 to the terminal 36. When switch 52 is shifted from the illustrated position to its alternate position, resistor 53 is disconnected from terminal 47 and resistor 51 sets the cathode of rectifier V4 about ten volts positive relative to the anode.

The direct current source for energizing terminal 47 at a potential of approximately 350 volts positive includes a power transformer 55 having a primary energized from a conventional alternating current source and a secondary 56 with a grounded center tap and rectifiers 57, 57′, 58 and 58′ providing full wave rectification with their cathodes connected to the terminal 47 via a filter circuit comprising a resistance 59 and choke inductance 60 in series, the terminals of the inductance being connected to ground through capacitors 61 and 62, respectively. One end of the transformer secondary 56 is also connected as energizing means for the direct current source 37 to the cathode of another rectifier V5 and the anode of the latter is connected to the negative terminal 36 by way of a choke inductance 65 and a resistance 66, the junction of the inductance and resistance being connected to ground through a capacitor and the terminal 36 being connected to the cathode of a voltage regulator diode V6, the anode of which is grounded.

The power transformer 55 comprises a low voltage secondary 71 for supplying the cathode heaters for each of the tubes V2, V3, V4 and V5. In the particular circuit illustrated, the cathode of tube V1 is directly heated and energized from a suitable direct current source (not shown) connected to the terminal 72.

The primary of the low or audio frequency transformer 43 is connected by a 500 ohm line to the secondary of another transformer 73, the primary of which is connected in the output circuit of the audio amplifier.

The audio amplifier, being of a well known construction, includes the triode V2 to the grid 75 of which is supplied an audio signal from any suitable source connected to the terminal 76. The grid is connected to ground through a coupling resistance 77. The cathode of triode V2 is connected to ground through the paralleled resistance 79 and capacitor 80 across which a suitable biasing potential is established when the tube is conductive. The anode of tube V2 is coupled to the control grid 82 of tube V3 by way of the capacitor 83 and coupling resistor 84, the latter connecting the control grid 82 and ground. The cathode of tube V3 is connected to ground through bias resistance 86 and the by-pass capacitor 87. The screen grid 88 of tube V3 is connected directly to a terminal 89 for applying a positive direct current potential such as that obtainable at terminal 47. The terminal 89 is connected via the primary of transformer 73 to the anode of tube V3, and the primary is shunted by a capacitor 90 as well as by resistors 91 and 92 connected in series, the junction of the resistors 91 and 92 being connected through a resistor 93 to the anode of tube V2.

In a proven system of the type illustrated, the following circuit components were used:

V1—4-250A; V2—6J5; V3—6BQ6; V4—6H6, or selenium rectifier, the 6H6 being preferred for better linearity; V5—6X4; potentiometer 46—40,000 ohms; resistor 53—200,000; resistor 51—200,000 ohms. The transmitter was run at 750 to 950 watts depending on the plate voltage used.

*Operation*

The operation of the present invention is in part self-explanatory from the foregoing description, but is further clarified by the following comments. With the ganged switches 45 and 52 in the illustrated positions, the potential on the screen grid 12 of tube V1 will be a function of both the rectified audio voltage as well as the direct current potential determined by the position of the adjustable tap on the potentiometer 46, the latter determining the level of the residual or unmodulated carrier. By shifting this adjustable tap to a higher positive potential, or to the right as seen in the drawing, the level of the residual or unmodulated carrier will be increased in the output, but the amplitude between the peaks of the modulated carrier envelope will remain unchanged if such adjustment is made without changing the peak voltage of the audio modulating signal. Conversely, if the adjustable tap is shifted to a lower potential or ground, the residual carrier will be suppressed as much as 15 to 20 decibels without changing the peaks of the modulated signal envelope which are dependent on the level of the audio signal.

Upon application of a modulating signal to the input terminal 76 of the audio amplifier, the potential of the screen grid 12 will fluctuate in accordance with the rectified audio signal traversing the rectifier V4 and the secondary of transformer 43. The potential established across resistor 53 will determine the bias voltage on rectifier V4, and while radio frequency energy is supplied to the input of the modulator, there will always be at least a predetermined minimum level of R.F. carrier measurable at the output of the modulator during modulation because the bias of resistor 53 prevents the modulating signal from ever approaching the point of cut off of tube V1 and in this way prevents undesirable splatter that might otherwise occur.

The switches 45 and 52 may be shifted so that the lower end of resistor 53 is disconnected from the direct current source and the adjustable contact of switch 45 is connected to the negative terminal 36 of the power source 37. This will achieve a further suppression of the carrier providing improved side band operation, the suppression being of the order of 50 to 60 decibels, but the biasing of rectifier V4, in this instance by the potential of approximately 10 volts across resistor 51, again establishes a predetermined minimum carrier level during modulation to prevent splatter.

With the carrier suppressed substantially, the modulating signal is readily received on receivers adapted for side band reception, whereas with the switches in the position illustrated and with the adjustable tap of potentiometer 46 in position to provide a high level of residual carrier in the modulator output without modulation, the signal output approaches more nearly that of conventional amplitude modulated signals.

The screen grid circuit of the power amplifier tube places a varying load on the modulator and accordingly the illustrated audio amplifier is provided with negative feedback to stabilize its operation.

It is apparent from the foregoing that in the absence of modulation, the amplitude of the carrier signal in the modulator output is dependent primarily upon the position of the adjustable tap of potentiometer 46. However, when the modulating signal is applied at terminal 76, the conductivity of tube V4 and the shape of the modulated carrier envelope is dependent primarily upon the amplitude of the modulating signal except that the carrier envelope will have a predetermined minimum throughout most of each interval corresponding to a negative swing of the audio signal, this minimum amplitude being determined by the bias on the rectifier V4.

The modulating system according to this invention is basically a more efficient means of voice communication, almost doubling the efficiency of a given transmitter. The total power input to a given transmitter to get the same power output has been found to be reduced by as much as half. The invention of this system has been compared with a conventional plate modulated system using a manufactured unit for test purposes. With a type 807 tube used in the power amplifier, modulated with a pair of 807 tubes in high level plate modulation it was found that 54 watts were supplied to the plate input and 60 watts to the modulators giving a total average input of 114 watts to achieve a predetermined peak power output. Using the system according to the present invention, the same transmitter required only an average input total of 43 watts to get the same peak power output as seen on an oscilloscope.

The present invention, being compatible with side band transmission or normal amplitude modulation, is very valuable for emergency applications because communication can be established regardless of the type of receiver being used, i.e., either side band or conventional amplitude modulation receivers. Also, the transmitter can be screen keyed by opening the screen lead so that C.W. operation can also be incorporated in the transmitter to achieve a third type of signalling operation.

This basic system of modulating the radio frequency carrier by means of a rectified lower frequency signal is not limited to any particular frequency bands and will work on all radio frequency bands with the full range of audio frequencies also being useful for modulation.

By utilizing only the positive audio pulses in the manner set forth herein and by having only nominal residual carriers during the negative audio pulses, the screen grid potential fluctuates at an audio rate which in turn controls the power output of the tube at the same audio rate. This system differs from other types of screen modulation and can use the full C.W. rating for a given tube with high grid current, recommended bias, and maximum plate voltage so that full class C tube efficiency of 70% or better is obtainable whereas normal screen modulating systems using both positive and negative audio pulses for modulation achieve efficiency of about 33%.

For optimum operation of the system it is suggested that the power amplifier tube be loaded at the peak output pulses to the maximum allowable plate current and also it is preferred that the antenna reactance be held to a minimum.

Distortion has not been found to be noticeable or objectionable on voice frequencies up to 3000 cycles per second. The system of the invention appears to be suitable for any voice communication without distortion or serious interference problems. The range of transmission for this system borders on that for C.W. operation since interference problems are greatly reduced because there is practically no (or very little) carrier during periods of no modulation for the inteference signal to beat against. As much as 90% of the power output is intelligence. The recommended method for receiving a signal from this system is with the receiver automatic volume control disabled and with the receiver sensitivity adjusted for good readability. Most automatic volume controls will not follow the modulation or speech rate fast enough and tends to distort the intelligence.

The power handling capabilities of tubes can safely be practically doubled due to the pulsing nature of the modulation. There appears to be no particularly critical adjustment of the present system for satisfactory operation, the transmitter being merely set up for normal class C operation and modulated in the manner defined herein using only positive pulses.

The only limitations on peak power output would result from the flat-topping that results by overdriving the screen, the flat-topping on peaks being an indication of distortion due to peak clipping and is to be avoided.

With maximum carrier suppression as defined hereinabove, the modulated signal can be copied on a receiver as an amplitude modulated signal with suppressed carrier, or also on either side band in receivers set for single side band operation. With full carrier insertion the signal cannot be audibly distinguished from a conventional amplitude modulation signal at the receiver.

Although with suppressed carrier the present system operates similarly to double side band operation, it may be adapted for single side band use by incorporating conventional techniques for eliminating one side band such as by means of a selective filter arrangement. This system can also be adapted for single side band suppressed carrier operation.

While this specification shows and describes one preferred embodiment in accordance with the present invention, it is understood that the same is not limited thereto but is susceptible of many changes and modifications within the spirit of the present invention, and it is intended to cover all such changes and modifications as are encompassed by the appended claims.

I claim:

1. A modulating system including a modulator tube having power supply means for producing current in the tube, control electrode means including a screen grid for controlling tube current, means for coupling a source of radio frequency energy to said tube so that the tube current is a function of the radio frequency energy supplied, circuit means including bias means and half-wave rectifier means for connecting a modulating signal exclusively to said screen grid, said rectifier means being operable to rectify the modulating signal so that modulating signals of one polarity only are effective to modulate the radio frequency energy and said bias means being normally operable to suppress a substantial part of the carrier constituted by said radio frequency energy in the absence of a modulating signal of said one polarity, and output means connected to said tube for utilizing modulated radio frequency energy.

2. A modulating system according to claim 1, wherein said bias means includes means for selectively adjusting the direct current superimposed with the rectified modulating signal on said screen grid.

3. A modulating system according to claim 1, wherein said bias means includes means for switching the polarity of the superimposed direct current to change the amplitude of a radio frequency carrier envelope in said output in the absence of a modulating signal.

4. A modulating system according to claim 1, wherein said half-wave rectifier means includes a rectifier having a cathode connected to said screen grid and an anode connected to a direct current source.

5. A modulating system according to claim 4 wherein the anode of said rectifier is connected to a source of positive potential relative to the modulator tube cathode.

6. A modulating system according to claim 4 wherein said anode is connected to a source of negative potential relative to the cathode of the modulator tube.

7. A modulating system according to claim 1, further comprising means for selectively applying to said rectifier means either a positive or negative clamping potential.

References Cited in the file of this patent

UNITED STATES PATENTS

| | | |
|---|---|---|
| 2,204,198 | Wiessner | June 11, 1940 |
| 2,493,484 | Franklin | Jan. 3, 1950 |
| 2,519,256 | Lee | Aug. 15, 1950 |
| 2,711,513 | Baer | June 21, 1955 |